United States Patent [19]

Adachi

[11] Patent Number: 5,248,250

[45] Date of Patent: Sep. 28, 1993

[54] APPARATUS FOR COOLING A MOLD

[76] Inventor: Masao Adachi, 2-32, Ohasu-kita 4-chome, Higashi-osaka-shi, Osaka, Japan

[21] Appl. No.: 873,123

[22] Filed: Apr. 24, 1992

[51] Int. Cl.⁵ .............................................. B29C 45/73
[52] U.S. Cl. ................................ 425/547; 264/328.16; 425/552
[58] Field of Search .............................. 425/547, 552; 264/328.14, 328.16

[56] References Cited

U.S. PATENT DOCUMENTS

| | | | |
|---|---|---|---|
| 4,743,192 | 5/1988 | Higuchi | 425/547 |
| 4,786,244 | 11/1988 | Holzschuh | 425/547 |
| 4,872,827 | 10/1989 | Noda | 425/547 |
| 5,055,025 | 10/1991 | Muller | 425/547 |

Primary Examiner—Tim Heitbrink
Attorney, Agent, or Firm—Edwin E. Greigg; Ronald E. Greigg

[57] ABSTRACT

An apparatus for cooling a mold employed in injection molding machines including a pair of bolt members, each composed of a threaded leg which engages a threaded hole formed at a coolant opening of the mold; a head driven by a fastening tool; a cylindrical body integrally extending between the leg and the head; and a coolant flow path extending from an open end of the leg, through the cylindrical body and to a side opening. The apparatus further includes first and second pipes, each having a main cylindrical portion of the same length as the cylindrical bodies of the pair of bolt members for receiving the bolt members, with a pair of ring packings being disposed above and below the side opening and surrounding the bolt members. The pipes further have secondary cylindrical portions, each integrally protruding sideways from the main cylindrical portion so as to engage one with another liquid-tightly and in a telescoping manner.

9 Claims, 3 Drawing Sheets

APPARATUS FOR COOLING A MOLD

BACKGROUND OF THE INVENTION

1. Field of the Invention

The invention relates to an apparatus for cooling a mold which is employed in injection molding machines or the like to form articles made of plastics.

2. Prior Art

A typical prior art apparatus for cooling a pair of mating molds is usually constructed in such a manner as shown in FIG. 6. Each mold in the pair comprises a coolant inlet and outlet disposed at its one side not in contact with the other mating mold. The apparatus comprises plugs P1 and P2 whose male-threaded legs "Q" are screwed into female-threaded apertures 2. A desirable length of hose "S" is connected at its ends to hose-retaining cylindrical portions "R" each having a stepped periphery which prevents the hose from being withdrawn. Disposed at another side opposite to the one side of the mold is the coolant inlet not shown in FIG. 6 (see FIG. 1). An appropriate cooling medium (hereinafter referred to as "coolant") which is in liquid state flows into mold through the coolant inlet in a direction shown at "X". The coolant subsequently penetrates the mold and then leaves it temporarily and through one of the plugs P1, before it enters the mold again through the hose "S" and the other plug P2. The returning coolant will penetrate again the mold, and flows out of it as shown by another arrow "Y". An indefinite length of hose is cut into the desirable length corresponding to a distance between the coolant inlet and outlet.

It is however disadvantageous that the plugs and the hose attached thereto in the prior art cooling apparatus do protrude sideways and outwardly a so great distance that a large space is required not only to mount the mold on a molding machine but also to house it in a workshop or toolshed. Further, such a projecting hose is likely to be damaged by collision with other objects, and is unsightly in its appearance. The hose is generally made of a rubber which will deteriorate in a short time due to a high temperature of the mold. Thus, the hose is not durable to a sufficient degree, and in the event that a hose which has a hole in its wall were use, it would disturb a molding process such as injection molding process to thereby cause a poor quality of molded products.

SUMMARY OF THE INVENTION

Therefore, an object of the present invention is to provide an apparatus for cooling a mold, which apparatus is free from the disadvantages inherent in the prior art apparatuses.

According to the present invention, the apparatus for cooling a mold comprises a pair of bolt-like members each composed of: a male-threaded leg screwed in a female-threaded hole formed at a coolant inlet or outlet of the mold; a head portion engageable with a fastening tool; and a cylindrical body formed integral with and between the leg and the head portion. Each of the bolt-like member comprises a coolant flow path which extends from an open end of the leg, through the cylindrical body and to a side opening. The apparatus further comprises a first and second pipes which are respectively composed of main cylindrical portions of substantially the same length as the cylindrical bodies of the bolt-like members, wherein each bolt-like member is inserted liquid-tightly in the corresponding main cylindrical portion with a pair of ring packings disposed above and below the side opening.

The apparatus according to the present invention is characterized by subsidiary cylindrical portions and which integrally protrude from side surfaces of the corresponding main cylindrical portions in fluid communication therewith, so as to respectively form the first and second pipes. The subsidiary cylindrical portion of the first pipe engages with the subsidiary cylindrical portion of the second pipe in a liquid-tight state and in a telescopic manner, with another packing being interposed between said portions.

The side opening of the bolt-like member may face the subsidiary cylindrical portion of the pipe, in a straight communication with the interior thereof. However, it may be more desirable in manufacture that a gap is formed between an outer peripheral surface of the cylindrical body of each bolt-like member and an inner peripheral surface of the main cylindrical portion of each pipe. The coolant flow path in this latter case will communicate with the subsidiary cylindrical portion, via the gap, and thus any angle of the fastened bolt-like member will be permitted relative to the mold ensuring an unhindered smooth flow of the coolant.

It is desirable that an axis of each subsidiary cylindrical portion is substantially perpendicular to an axis of the main cylindrical portion of the pipe. The subsidiary cylindrical portions must, at least at their regions fitting one on another, be in parallel with each other and also with the side surface of the mold.

The main and subsidiary cylindrical portions may either be formed integral using a heat-resistant plastics, or formed as discrete pieces of a metal such as soft steel and subsequently welded or soldered together.

The ring packings between the cylindrical body of bolt-like member and the pipe's main cylindrical portion may be carried by it and be held in place by means of the mold's side surface and a stepped lower surface of the head portion of bolt-like member. Alternatively, the ring packings may be O rings which are fitted on the cylindrical body of said bolt-like member.

The apparatus provided in accordance with the invention has the following advantages.

The dimension of the molds is not fixed but varied corresponding to the dimension of molded articles and the number thereof produced with one mold in one shot. A given distance between the coolant inlet and outlet is specific to each mold. The mold-cooling apparatus in the invention can meet such variable requirements by means of its subsidiary cylindrical portions which are connected together slidably in a telescopic manner. One of the subsidiary cylindrical portions may be pulled out of or retracted into the other so that the distance between the main cylindrical portions is readily adjusted to bring them into an exact alignment with the coolant inlet and coolant outlet. Further, the main cylindrical portions are located adjacent to the mold's side surface, with the subsidiary ones extending perpendicular to said main portions. Thus, the pipes which do not project so far from the mold as is in the case of the prior art apparatuses can be mounted compact on the mold and be stored neat in the toolshed. In addition, it is now possible to manufacture the pipes using an appropriate material which is heat-resistant and thus effective to eliminate the drawbacks of the prior art apparatuses.

BRIEF DESCRIPTION OF THE DRAWINGS

The preferred embodiments will be described hereinafter referring to the drawings, in which.

THE PREFERRED EMBODIMENTS

Figure 1:
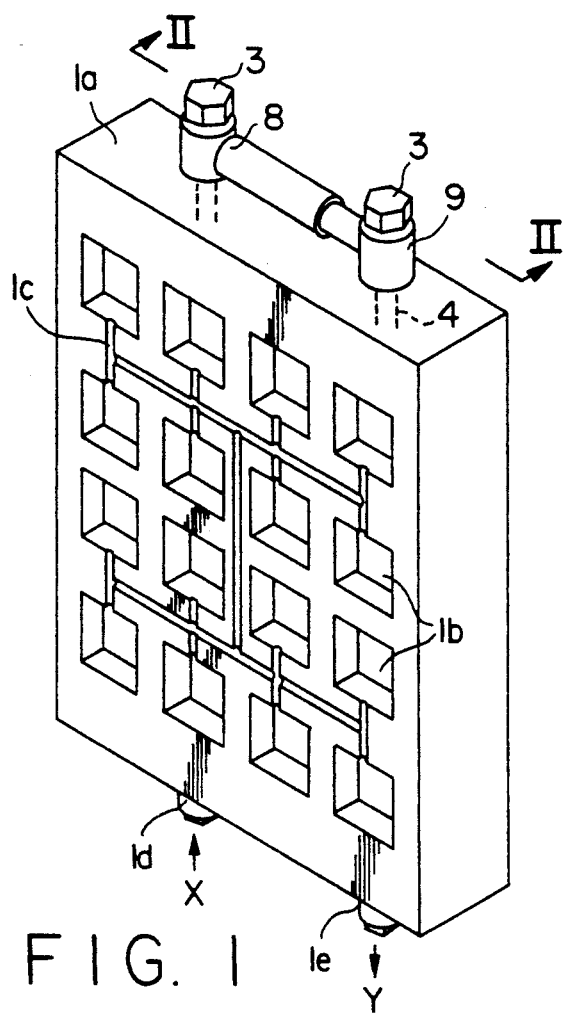
FIG. 1 is a perspective view of an apparatus for cooling a mold in a first embodiment.
Figure 2:
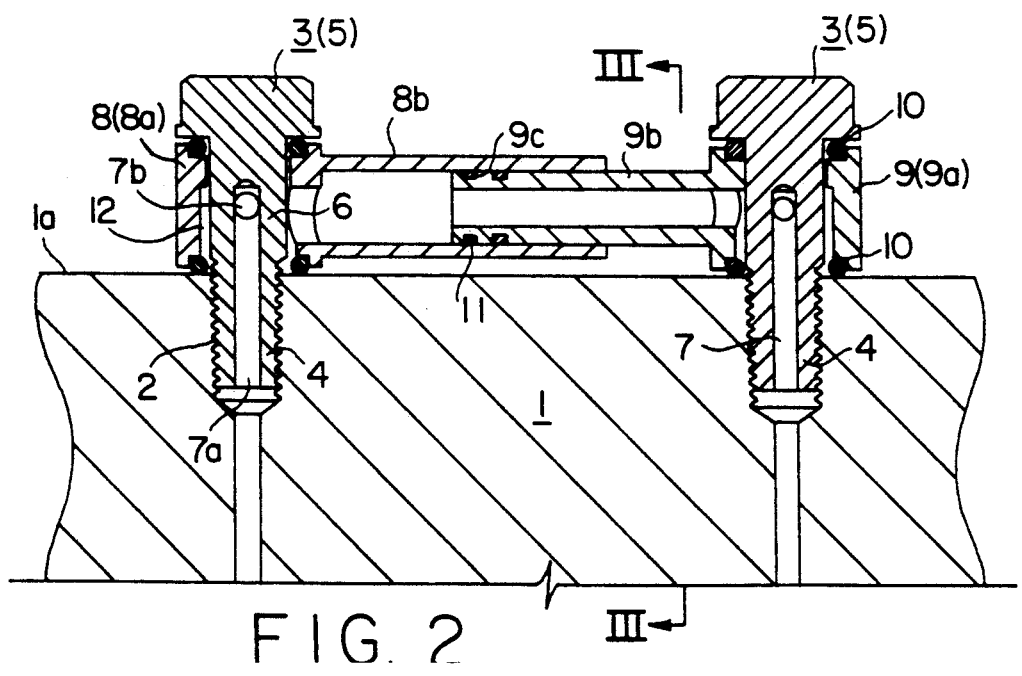
FIG. 2 is a cross-sectional view taken along the line II—II in FIG. 1.
Figure 3:
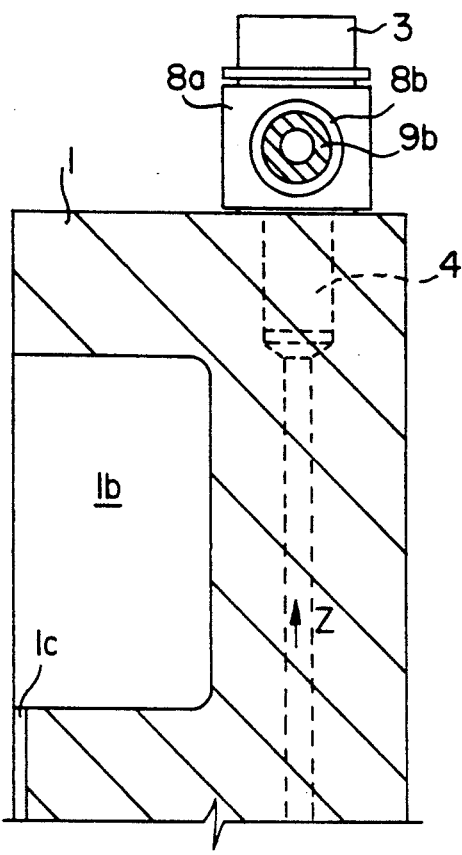
FIG. 3 is another cross-sectional view taken along the line III—III in FIG. 2.

In FIGS. 1 to 3 illustrating a first embodiment, bolt-like members 3 constituting an apparatus for cooling a mold are made of a corrosion-resistant metal such as a soft steel. Each of the bolt-like member 3 comprises a male-threaded leg 4 capable of being screwed in a female-threaded hole 2 formed at a coolant inlet or outlet which are disposed on a side surface 1a of the mold 1. A head portion 5 of each bolt-like member is engageable with a fastening tool. A cylindrical body 6 of said member 3 is formed integral with and between the leg 4 and the head portion 5. A coolant flow path 7 penetrating the cylindrical body 6 extends from an open end 7a of the leg 4 to a side opening 7b of the bolt-like member 3. The reference numerals 1b and 1c respectively denote mold cavities and runners extending thereto.

The apparatus further comprises a first and second pipes 8 and 9 made of a heat-resistant plastics and respectively having main cylindrical portions 8a and 9a, through which the bolt-like members 3 are inserted. A pair of an upper and lower ring packings 10 and 10 are disposed above and below the side opening 7b, respectively. With the bolt-like member 3 fastened into the female-threaded hole 2, the lower packing 10 is compressed between the side surface 1a of the mold 1 and a lower end surface of the main cylindrical portion 8a or 9a. On the other hand, the upper packing 10 is compressed by a lower flange-like surface of the head portion 5 and an upper end surface of said cylindrical portion. A liquid-tight sealing between the bolt-like member and the pipe 8 or 9 is provided in this manner.

The cylindrical bodies 6 of the bolt-like members 3 are of substantially the same length as the main cylindrical portions 8a and 9a. Subsidiary cylindrical portions 8b and 9b integrally protrude sideways from the main cylindrical portions, in fluid communication therewith.

The subsidiary cylindrical portion 8b of the first pipe 8 engages extensibly and retractably with the other subsidiary cylindrical portion 9b of the second pipe 9 in a liquid-tight state, with packings 11 being interposed between said portions. Each packing 11 is a ring packing fitted in a peripheral groove 9c of the subsidiary cylindrical portion 9b of a smaller diameter. The mating cylindrical portion 8b is of a greater diameter and slidable on the former portion while compressing the packings 11.

A gap 12 is formed between an inner peripheral surface of the main cylindrical portion 8a or 9a and an outer peripheral surface of the cylindrical body 6 of each bolt-like member 3. Thus, the coolant flow path 7 communicates with the subsidiary cylindrical portions 8b and 9b, via the gap 12. This enables the coolant to flow smooth and unhindered through said path and said portions, irrespective of an actual angle at which the bolt-like member 3 is fastened to the mold ensuring.

In this embodiment, an axis of the subsidiary cylindrical portion 8b and 9b is perpendicular to axes of the main cylindrical portions 8a or 9a of the pipe.

In operation of the apparatus in the embodiment, the coolant will enter the mold 1 from an inlet 1d in a direction indicated by "X", the inlet being usually disposed at a lower side surface. The coolant then ascends through the mold's section behind the cavities 1b, travels through the first and second pipes 8 and 9, and makes a U-turn to descend towards an outlet 1e disposed at the lower surface, before leaving the mold in a direction "Y". Such an intensive cooling of the mold is carried out in general after a given quantity of molten plastics will have been injected into the cavities 1b through the runners 1c.

Figure 4:
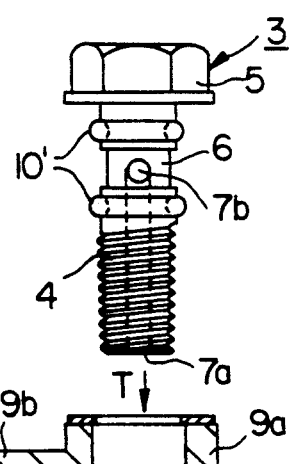
FIG. 4 is a cross-sectional view corresponding to FIG. 2 but showing a second embodiment.
Figure 4:
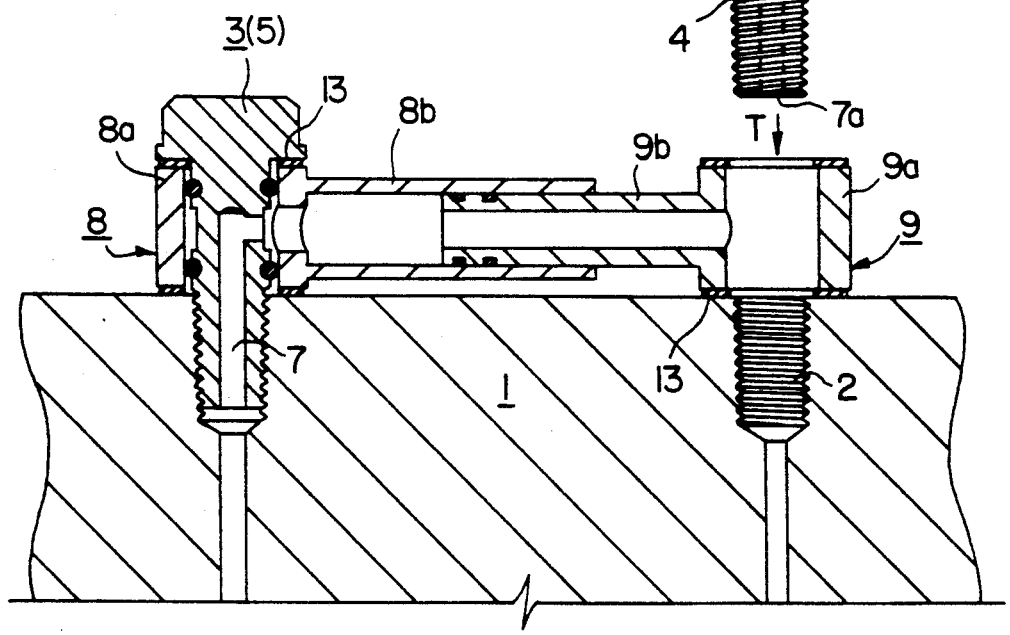

In a second embodiment shown in FIG. 4, O rings 10' and 10' are employed as the ring packings 10 for a liquid-tight connection of the bolt-like members 3 with the main cylindrical portions 8a and 9a of the pipes. The O rings are attached to the cylindrical body 6 of said member 3, and it is inserted in a direction of "T" to engage with the female-threaded hole 2. Sheet packings 13 are also attached to an upper and lower end surfaces of the main cylindrical portions 8a and 9a, in order to protect those surfaces and to improve liquid-tightness. Other features are the same as or similar to those which constitute the first embodiment.

Figure 5:
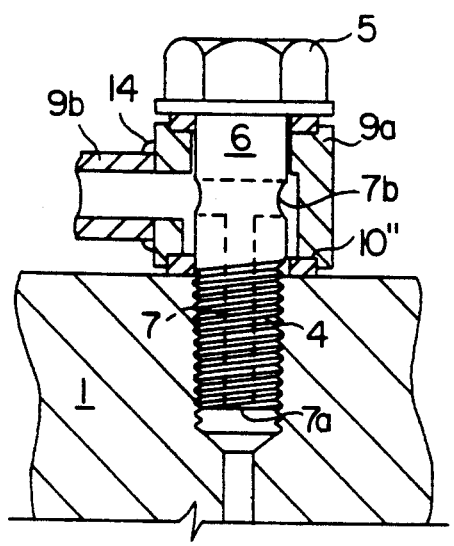
FIG. 5 is a further cross-sectional view corresponding to FIG. 2 but showing a third embodiment.
Figure 6:
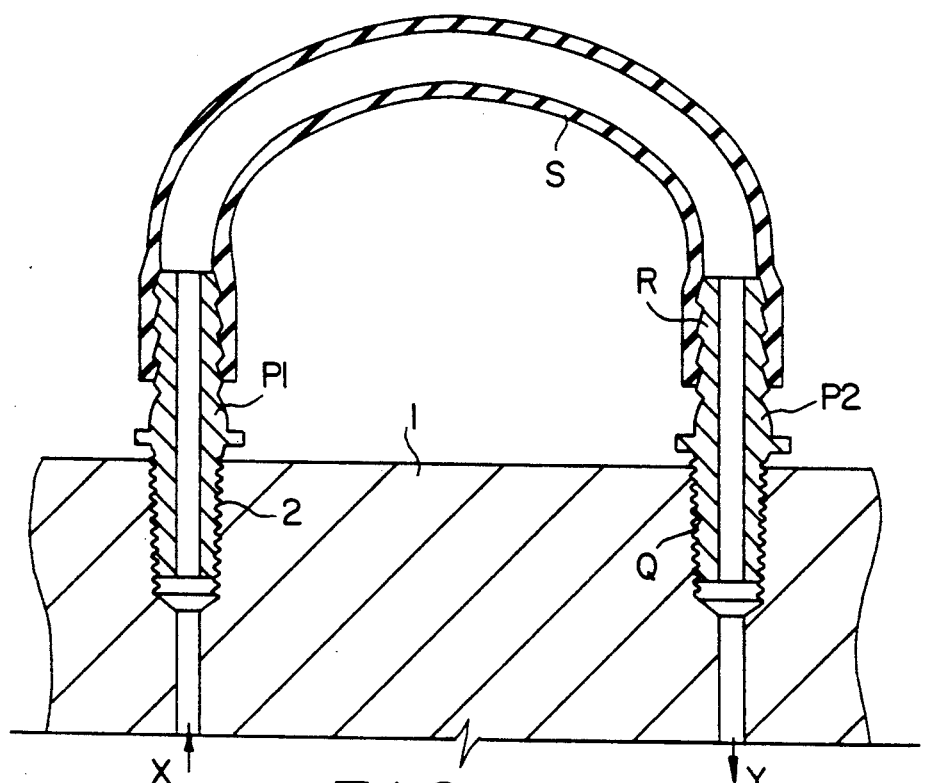
FIG. 6 is cross-section showing a prior art apparatus, also in a manner corresponding to FIG. 2.

In a third embodiment shown in FIG. 5, the main and subsidiary cylindrical portions 8a, 9a; and 8b, 9b are formed at first as discrete pieces of a soft steel, which pieces are then welded at 14. Ring packings 10" of a rectangular cross section are employed here in place of the aforementioned ring packings 10 or O rings 10', with other features being similar to those which are included in the preceding embodiments. Heat resistance of both the pipes 8 and 9 is therefore improved compared with those in the apparatuses in said preceding embodiments.

Various modifications may be applicable to the above embodiments. For example, the subsidiary portions 8b and 9b may be threaded and screwed in the corresponding main portions 8a and 9a so that the latter portions can be of the same shape enhancing an advantage in manufacture thereof.

It will be apparent that the apparatus in the invention is free from the drawbacks inherent in the prior art apparatuses. The subsidiary cylindrical portions connected together slidably in a telescopic manner can be extended or retracted to match the positions of main cylindrical portions to the distance between the coolant inlet and outlet. Because the subsidiary cylindrical portions extend perpendicular to the main ones located closely to the mold, the extent to which the former portions protrude from the mold is significantly reduced compared the prior art apparatuses. Therefore, the mold-cooling apparatus in the invention is mounted compact on the mold and stored neat in the toolshed. Moreover, the pipes are manufactured using a highly heat-resistant material, whereby their durability is improved to resolve the problems of early deterioration and breakage.

It also may be possible to prepare the pipes of one type of having the subsidiary portion of a given length and those of the other types having that portion of various lengths. Such a system will be advantageous in that the apparatus can be more easily adapted to a greater variation in the distance between the coolant inlet and outlet of the molds.

What is claimed is:

1. An apparatus for cooling a mold (1), the apparatus comprising:
   a pair of bolt members (3);
   a first pipe (8); and
   a second pipe (9),
   each bolt member (3) comprising:
   a male-threaded leg (4) threaded in a female-threaded hole (2) formed at a collant opening of the mold (1);
   a head portion (5) engageable with a fastening tool;
   a cylindrical body (6) formed integral with and between the male threaded leg(4) and the head portion (5); and
   a coolant flow path (7) which extends from an open end (7a) of the leg (4), through the cylindrical body (6) and to a side opening of the cylindrical body (7b),
   each of the first and second pipes (8) and (9) comprising:
   a main cylindrical portion (8a,9a) of substantially the same length as the cylindrical bodies (6) of the bolt members, wherein each bolt member (3) is inserted liquid-tightly in the corresponding main cylindrical portion of said first and second pipes with a pair of ring packings (10, 10', 10'') disposed above and below the side opening (7b); and
   a secondary cylindrical portion (8b, 9b) which integrally protrude from side surfaces of the corresponding main cylindrical portions (8a) and (9a) in fluid communication therewith, so as to respectively form the first and second pipes (8) and (9),
   wherein the secondary cylindrical portion (8b) of the first pipe (8) engages with the secondary cylindrical portion (9b) of the second pipe (9) in a liquid-tight state and in a telescopic manner, with a packing (11) being interposed between said portions.

2. An apparatus as defined in claim 1, wherein a gap (12) is formed between an outer peripheral surface of the cylindrical body of each bolt member and an inner peripheral surface of the main cylindrical portion of each of said first and second pipes.

3. An apparatus as defined in claim 1, wherein an axis of each secondary cylindrical portion is substantially perpendicular to an axis of the main cylindrical portion of each of said first and second pipes, and the secondary cylindrical portions are disposed in parallel with each other and also with side surfaces of the mold.

4. An apparatus as defined in claim 3, wherein the main and secondary cylindrical portions are formed integral of a heat-resistant plastic.

5. An apparatus as defined in claim 3, wherein the main and secondary cylindrical portions are formed as discrete pieces of a metal and subsequently welded together.

6. An apparatus as defined in claim 2, wherein an axis of each secondary cylindrical portion is substantially perpendicular to an axis of the main cylindrical portion of each of said first and second pipes, and the secondary cylindrical portions are disposed in parallel with each other and also with side surfaces of the mold.

7. An apparatus as defined in claim 6, wherein an axis of each secondary cylindrical portion is substantially perpendicular to an axis of the main cylindrical portion of each of said first and second pipes, and the secondary cylindrical portions are disposed in parallel with each other and also with side surfaces of the mold.

8. An apparatus as defined in claim 3, wherein the main and secondary cylindrical portions are formed as discrete pieces of a metal and subsequently soldered together.

9. An apparatus as defined in claim 6, wherein the main and secondary cylindrical portions are formed as discrete pieces of a metal and subsequently soldered together.

* * * * *